(12) United States Patent
Deng

(10) Patent No.: US 8,864,436 B2
(45) Date of Patent: *Oct. 21, 2014

(54) ALIGNMENT DEVICE OF CUTTING MACHINE

(75) Inventor: Hongtao Deng, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 194 days.

This patent is subject to a terminal disclaimer.

(21) Appl. No.: 13/381,943

(22) PCT Filed: Dec. 7, 2011

(86) PCT No.: PCT/CN2011/083657
§ 371 (c)(1),
(2), (4) Date: Dec. 31, 2011

(87) PCT Pub. No.: WO2013/082776
PCT Pub. Date: Jun. 13, 2013

(65) Prior Publication Data
US 2013/0142610 A1    Jun. 6, 2013

(30) Foreign Application Priority Data
Dec. 6, 2011   (CN) .......................... 2011 1 0401404

(51) Int. Cl.
*B21B 39/22*   (2006.01)
*B65G 13/00*   (2006.01)
*F16C 27/00*   (2006.01)
*B65G 13/12*   (2006.01)
*F16C 27/04*   (2006.01)

(52) U.S. Cl.
CPC ................ *B65G 13/12* (2013.01); *F16C 27/04* (2013.01); *B21B 39/22* (2013.01)

USPC ................... 414/774; 193/35 R; 193/35 MD; 384/49; 384/99

(58) Field of Classification Search
USPC ............. 414/774; 254/29 A; 384/49, 109, 99, 384/490; 193/35 MD, 35 R, 35 SS; 16/26
See application file for complete search history.

(56) References Cited

U.S. PATENT DOCUMENTS

| 3,265,452 | A | * | 8/1966 | Pan et al. ........................ 384/109 |
| 3,874,749 | A | * | 4/1975 | Maniak ........................... 384/109 |
| 4,553,795 | A | * | 11/1985 | Takagi ............................ 384/49 |
| 4,696,583 | A | * | 9/1987 | Gorges ............................ 384/49 |

(Continued)

*Primary Examiner* — Gregory Adams
*Assistant Examiner* — Lynn Schwenning
(74) *Attorney, Agent, or Firm* — Cheng-Ju Chiang

(57) ABSTRACT

The present invention provides an alignment device of cutting machine, which includes: a stand and a ball transfer unit mounted on the stand. The ball transfer unit includes a main body, a first rotating body, and a plurality of second rotating bodies arranged between the main body and the first rotating body. The main body has an end forming a receiving chamber and thus forming a receiving chamber sidewall. The second rotating bodies are rotatably arranged on the receiving chamber sidewall. The main body forms an air entrance passage in communication with the receiving chamber. The receiving chamber sidewall extends out to form a bearing section corresponding to the air entrance passage. The bearing section has a side surface in which air outlet ports are formed. The main body has an opposite end forming a connection section that is mateable and coupleable to the stand. The present invention uses a ball transfer unit to replace the float pad made of porous carbon fiber material for aligning a glass substrate in order to achieve the purposes of lowering down cost.

5 Claims, 4 Drawing Sheets

(56) References Cited

U.S. PATENT DOCUMENTS

| | | | |
|---|---|---|---|
| 5,375,679 A | * | 12/1994 | Biehl .................. 182/181.1 |
| 7,370,746 B2 | * | 5/2008 | Iguchi et al. ............ 193/35 MD |
| 7,455,470 B2 | * | 11/2008 | Brodowski .................... 403/135 |
| 2010/0065400 A1 | * | 3/2010 | Pruett et al. ............. 193/35 MD |

* cited by examiner

ALIGNMENT DEVICE OF CUTTING MACHINE

BACKGROUND OF THE INVENTION

1. Field of the Invention

The present invention relates to the technical field of TFT-LCD (Thin Film Transistor-Liquid Crystal Display) manufacturing process, and in particular to an alignment device of cutting machine.

2. The Related Arts

A liquid crystal display is commonly abbreviated as LCD, and the operation principle is placing liquid crystal molecules between two parallel pieces of glass. A plurality of tiny vertical and horizontal conductive wires is arranged between the pieces of glass and change of direction of the liquid crystal molecules is controlled through application of electricity so as to refract light out to form an image. The liquid crystal display is now widely used due to various advantages of being compact in size, saving of power, and being free of radiations. In the state-of-the-art manufacturing techniques of liquid crystal display devices, it is common to form a plurality of liquid crystal display units on a large-sized glass substrate. In such a manufacturing process, the glass substrate must be cut into a number of liquid crystal display units for the subsequent processing to be carried out. With the development of the manufacturing technique of liquid crystal display device, the liquid crystal panel is going toward higher generation and the size and weight of the glass substrate is getting greater and greater. In the manufacturing process of liquid crystal display device, the glass substrate is heaviest in the time period that is behind vacuum panel alignment and before cutting. Consequently, for pre-alignment done before cutting, it is often that an excessive frictional force is induced by the excessively heavy weight of the substrate so as to result in an issue of alignment abnormality.

To overcome such a problem, the known cutting machines, such as 8.5-generation cutting machine (Non-Cross Type) of Mitsuboshi Diamond Industrial Co., Ltd., Japan, carry out pre-alignment, initial cutting, and secondary cutting by providing a float pad on a work table for the performance of alignment. As shown in FIG. 1, the cutting machine comprises a machine body (not shown), a stand 100, and a float pad 200 mounted on the stand 100. The float pad 200 is made of a porous carbon fiber material. The way of alignment of the float pad 200 is that a glass substrate is positioned on the float pad 200 and dry air is blown out of small pores of the float pad 200. This is equivalent to reducing, to some extents, most of the gravitational force of the glass substrate so that excellent alignment can be realized. However, the porous carbon fiber material is excessively expensive and this increases the manufacturing cost to quite an extent, making it detrimental to popularization.

SUMMARY OF THE INVENTION

An objective of the present invention is to provide an alignment device of cutting machine, which realizes excellent effect of alignment and is of low cost.

To achieve the above objective, the present invention provides an alignment device of cutting machine, which comprises: a stand and a ball transfer unit mounted on the stand. The ball transfer unit comprises a main body, a first rotating body, and a plurality of second rotating bodies arranged between the main body and the first rotating body. The main body has an end forming a receiving chamber and thus forming a receiving chamber sidewall. The second rotating bodies are rotatably arranged on the receiving chamber sidewall. The main body forms an air entrance passage in communication with the receiving chamber. The receiving chamber sidewall extends out to form a bearing section corresponding to the air entrance passage. The bearing section having a side surface in which air outlet ports are formed. The main body has an opposite end forming a connection section that is mateable and coupleable to the stand.

The receiving chamber sidewall has a free end forming a stop rim extending to each other, the second rotating bodies being arranged between the stop rim and the bearing section.

The connection section forms an external thread, the stand forming a threaded hole corresponding to the connection section for threading engagement with the external thread of the connection section.

The air entrance passage has an end located in a side surface of the main body and an opposite end arranged in a center of the receiving chamber.

The air outlet ports are uniformly arranged in the side surface of the bearing section.

The air outlet pots comprise through holes or recesses.

The efficacy of the present invention is that the present invention provides an alignment device of cutting machine, which uses a ball transfer unit to replace the float pad made of porous carbon fiber material for aligning a glass substrate. The ball transfer unit comprises an air entrance passage communicating with a receiving chamber and the air entrance passage draws in air to blow off foreign objects, such as glass powders, present on the receiving chamber sidewall so as to ensure smooth operation of the ball transfer unit and thereby ensuring the result of alignment and lowering down the cost to quite an extent.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description will be given to a preferred embodiment of the present invention and the drawings thereof.

Figure 1:
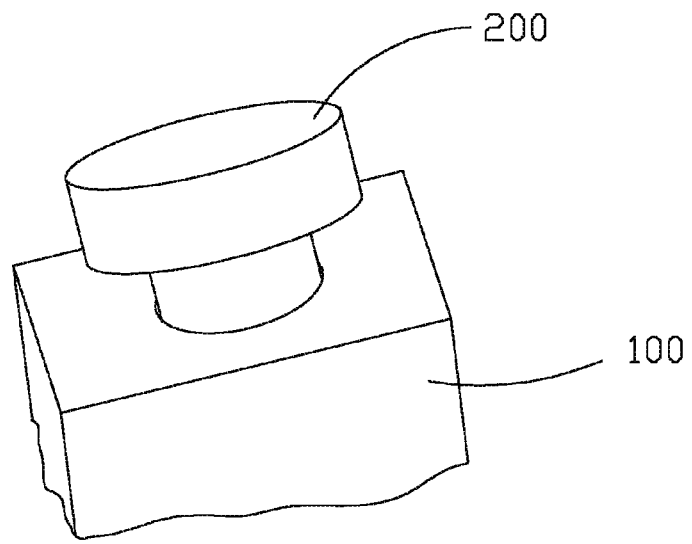
FIG. 1 is a schematic view showing an alignment device of a conventional cutting machine.
Figure 2:
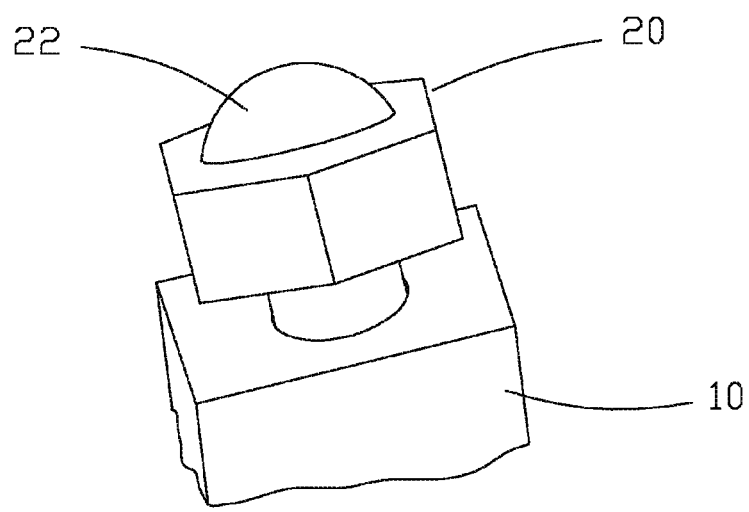
FIG. 2 is an assembled view of an alignment of cutting machine according to the present invention.
Figure 3:
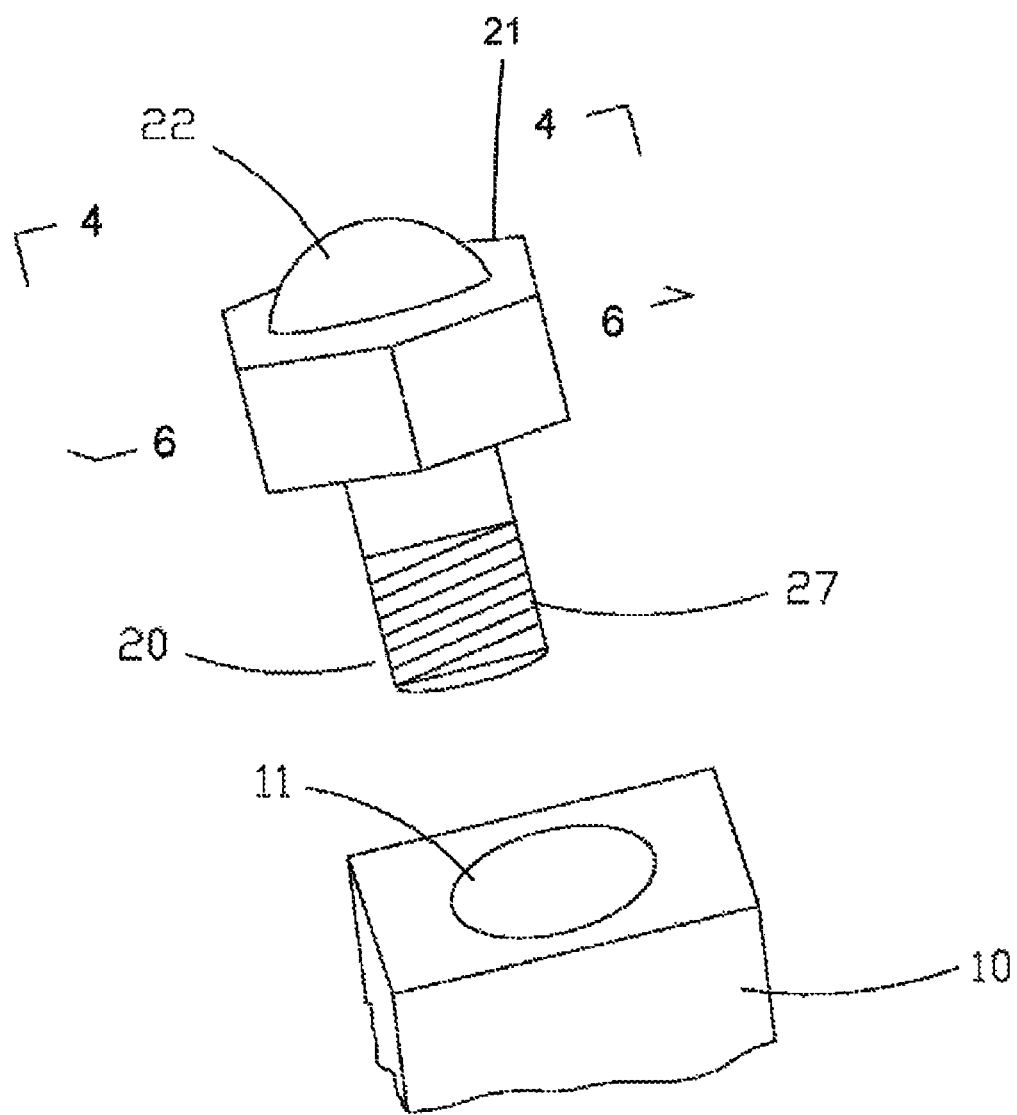
FIG. 3 is an exploded view of FIG. 2.
Figure 4:
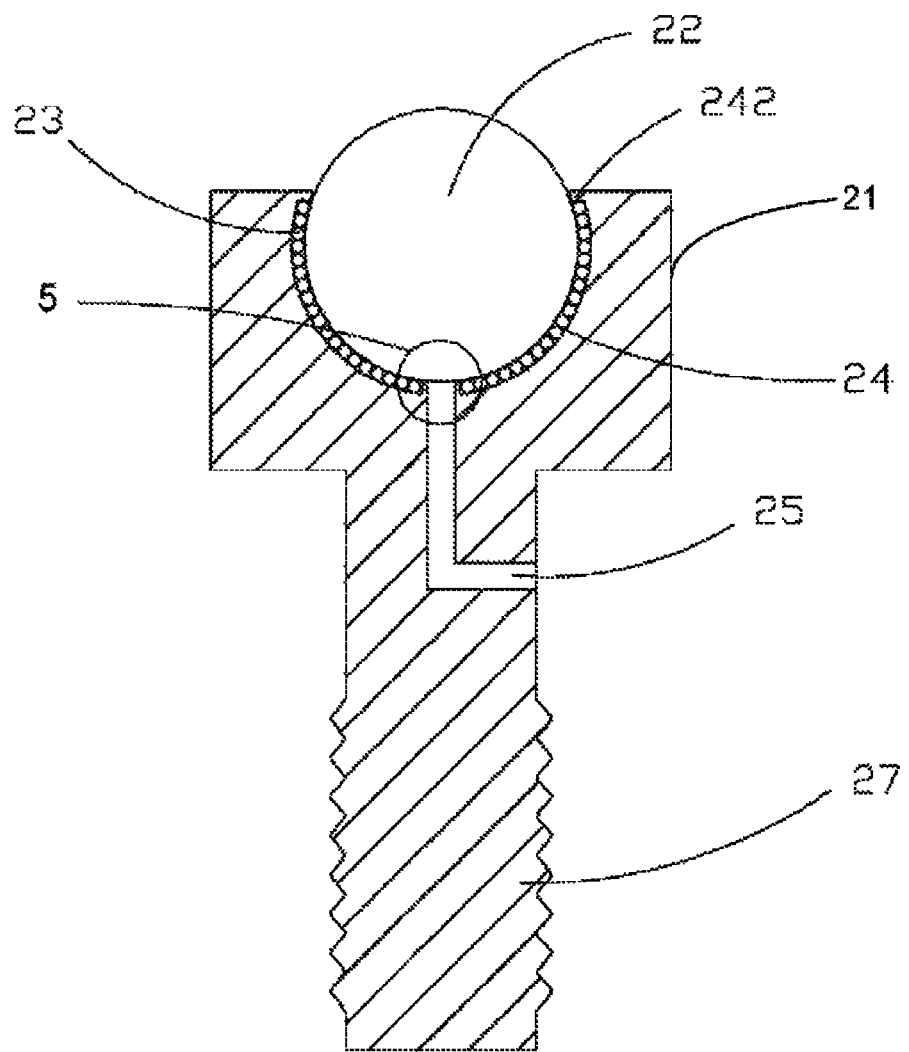
FIG. 4 is a cross-sectional view of a ball transfer unit taken along line 4-4 of FIG. 3.
Figure 5:
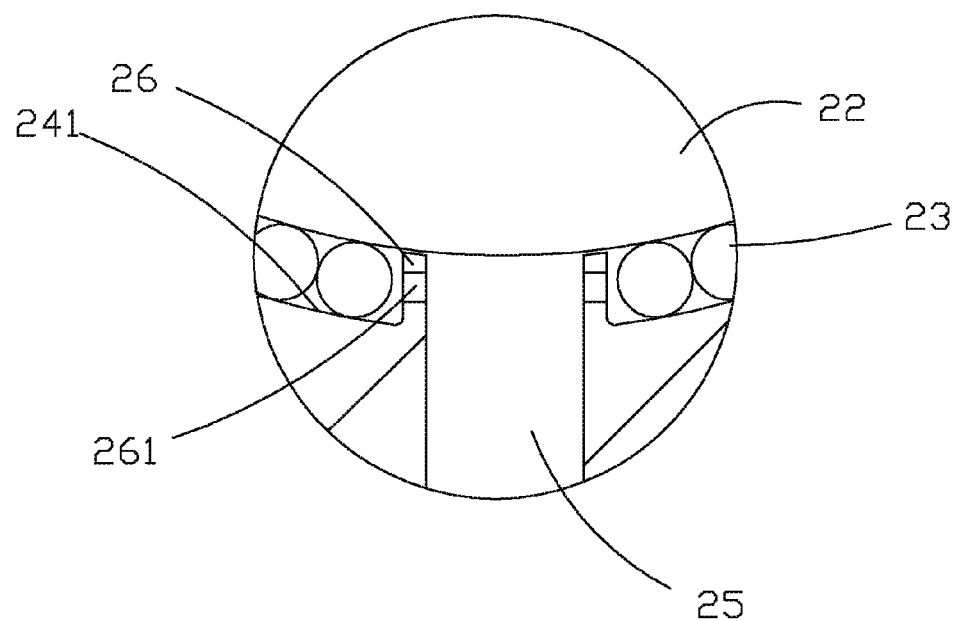
FIG. 5 is an enlarged view of a circled portion that is marked as "5" in FIG. 4.
Figure 6:
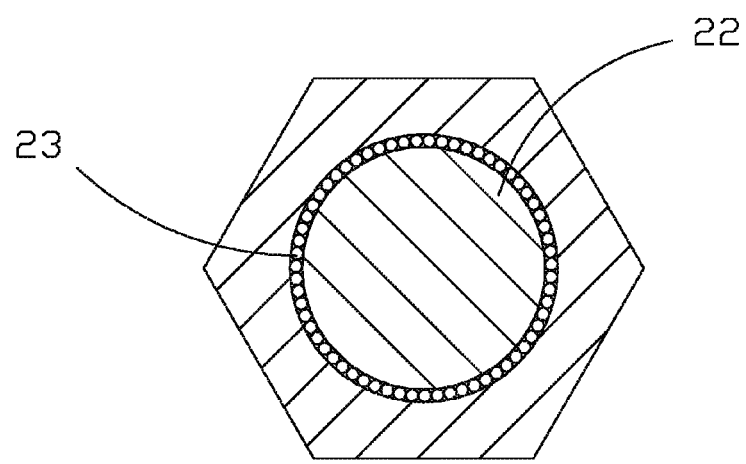
FIG. 6 is a cross-sectional view of the ball transfer unit taken along line 6-6 of FIG. 3.

As shown in FIGS. 2-6, the present invention provides an alignment device of cutting machine, which comprises: a stand 10 and a ball transfer unit 20. The operation of the stand 10 is identical to that of a stand of a known float pad. The present invention uses the ball transfer unit 20 to replace the float pad made of porous carbon fiber material for the operation of alignment of a glass substrate in order to achieve the purpose of lowering down cost.

The ball transfer unit 20 comprises a main body 21, a first rotating body 22, and a plurality of second rotating bodies 23 that is arranged between the main body 21 and the first rotating body 22. The main body 21 has an end forming a receiving chamber 24 and thus forms a receiving chamber sidewall 241. The second rotating bodies 23 are rotatably arranged on the receiving chamber sidewall 241. The main body 21 forms an air entrance passage 25 in communication with the receiving chamber 24 and the receiving chamber sidewall 241 extends out to form a bearing section 26 corresponding to the air entrance passage 25. The bearing section 26 has a side surface in which air outlet ports 261 are formed. The air outlet ports 261 can be uniformly arranged on the side surface of the bearing section 26. The air outlet ports 261 can be through holes or recesses. An opposite end of the main body 21 forms a connection section 27 that mates and is coupled to the stand 10. In a preferred embodiment of the present invention, the connection section 27 forms an external thread and the stand 10 forms a threaded hole 11 corresponding to the connection section 27 for threading engagement with the external thread of the connection section 27.

The receiving chamber sidewall 241 has a free end forming a stop rim 242 and the second rotating bodies 23 are arranged between the stop rim 242 and the bearing section 26.

Preferably, the air entrance passage 25 has an end located in a side surface of the main body 21 and an opposite end arranged in a center of the receiving chamber 24.

In operation, the present invention uses the air entrance passage 25 to introduce clean dry air that blows off foreign objects, such as glass powders, present on the receiving chamber sidewall so as to prevent the foreign objects from getting stuck in the gap that convert rolling friction of the ball transfer unit into sliding friction and affect the performance of operation.

In summary, the present invention provides an alignment device of cutting machine, which uses a ball transfer unit to replace the float pad made of porous carbon fiber material for aligning a glass substrate. The ball transfer unit comprises an air entrance passage communicating with a receiving chamber and the air entrance passage draws in air to blow off foreign objects, such as glass powders, present on the receiving chamber sidewall so as to ensure smooth operation of the ball transfer unit and thereby ensuring the result of alignment and lowering down the cost to quite an extent.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An alignment device of a cutting machine, comprising a stand and a ball transfer unit mounted on the stand, the ball transfer unit comprising a main body, a first rotating body, and a plurality of second rotating bodies arranged between the main body and the first rotating body, the main body having an end forming a receiving chamber and thus forming a receiving chamber sidewall that defines a spherically curved surface, the second rotating bodies being rotatably arranged on the spherically curved surface of the receiving chamber sidewall, the main body forming an air entrance passage in communication with the receiving chamber for supplying an airflow to the receiving chamber, the receiving chamber sidewall comprising a raised portion extending from the spherically curved surface of the receiving chamber sidewall and circumferentially surround the air entrance passage so that the second rotating bodies are rollable circumferentially around the air entrance passage, the raised portion forming a bearing section that surrounds and delimits the air entrance passage and spaces the first rotating body from the spherically curved surface, the bearing section having a side surface in which air outlet ports are formed for each supplying air into the receiving chamber in a direction substantially tangential to the surface of the receiving chamber sidewall, the receiving chamber sidewall having a free end forming a stop rim, whereby the second rotating bodies are confined between the stop rim and the bearing section, the main body having an opposite end forming a connection section that is mateable and coupleable to the stand.

2. The alignment device of a cutting machine as claimed in claim 1, wherein the connection section forms an external thread, the stand forming a threaded hole corresponding to the connection section for threading engagement with the external thread of the connection section.

3. The alignment device of a cutting machine as claimed in claim 1, wherein the air entrance passage has an end located in a side surface of the main body and an opposite end arranged in a center of the receiving chamber.

4. The alignment device of a cutting machine as claimed in claim 1, wherein the air outlet ports are uniformly arranged in the side surface of the bearing section.

5. The alignment device of a cutting machine as claimed in claim 4, wherein the air outlet ports comprise through holes or recesses.

\* \* \* \* \*